United States Patent [19]

Hiller et al.

[11] 3,880,892

[45] Apr. 29, 1975

[54] PRODUCTION OF 1-AMINO-4-HYDROXYANTHRAQUINONES SUBSTITUTED IN THE 2- AND/OR 3-POSITIONS

[76] Inventors: Heinrich Hiller, Corneliusstrasse, 6800 Mannheim; Alfred Schuhmacher, 36 von-weber-Strasse; Helmut Goerth, 15 Rubensstrasse, both of 6700 Ludwigshafen, all of Germany

[22] Filed: Dec. 15, 1974

[21] Appl. No.: 315,473

[52] U.S. Cl. ................................. 260/380; 260/376
[51] Int. Cl. ............................................. C09b 1/50
[58] Field of Search ..................... 260/377, 376, 380

[56] References Cited
UNITED STATES PATENTS

| | | | |
|---|---|---|---|
| 1,798,156 | 3/1931 | Gubelmann et al. | 260/380 |
| 1,867,069 | 7/1932 | Gassner et al. | 260/380 |

FOREIGN PATENTS OR APPLICATIONS

| | | | |
|---|---|---|---|
| 301,119 | 11/1928 | United Kingdom | 260/380 |

OTHER PUBLICATIONS

Barnett, *Anthracene and Anthroquinone*, pp. 130–132 (1921) QD393B3.
Beilstein, Handrich der Organischen Chemie, 4th Ed. Band 14, p. 268, (1931).

*Primary Examiner*—Lorraine A. Weinberger
*Assistant Examiner*—E. Jane Skelly
*Attorney, Agent, or Firm*—Johnston, Keil, Thompson & Shurtleff

[57] ABSTRACT

Production of 1-amino-4-hydroxyanthraquinones, which can be substituted in the 2- and 3-positions by carboxylic acid, carboxylic ester or alkyl groups or chlorine or bromine, by heating 3'-nitrobenzoylbenzoic acids, which can be substituted in the 4'- and 5'-positions, in sulfuric acid or oleum in the presence of boric acid, boric acid esters, boron trihalides or their complex compounds to temperatures between about 120° and 200°C. The reaction products are dyes or intermediates for valuable disperse dyes.

8 Claims, No Drawings

PRODUCTION OF 1-AMINO-4-HYDROXYANTHRAQUINONES SUBSTITUTED IN THE 2- AND/OR 3-POSITIONS

The invention relates to a process for the production of 1-amino-4-hydroxyanthraquinones which can be substituted in the 2- and 3-positions.

1-amino-4-hydroxyanthraquinones substituted in the 2- and 3-positions by halogen, alkyl, carboxyl or alkoxycarbonyl are dyes or serve as intermediates for the production of dyes. For example, 1-amino-2-chloro-4-hydroxyanthraquinone or its 2-bromo counterpart is an important intermediate for the production of valuable disperse dyes.

1-amino-2-bromo-4-hydroxyanthraquinone is obtained, for example, by bromination of 1-aminoanthraquinone to 2,4-dibromo-1-aminoanthraquinone and subsequent hydroxylation of the dibromo compound in sulfuric acid/boric acid. The corresponding 2-chloro compound of 1-amino-4-hydroxyanthraquinone can, for example, be obtained according to U.S. Pat. No. 1,798,156 from 3'-amino-4',6'-dichlorobenzoyl-benzoic acid by ring closure in concentrated sulfuric acid and subsequent hydroxylation of the resulting dichloro-anthraquinone derivative in concentrated sulfuric acid/boric acid, but is only obtained in moderate yields. Both processes are expensive in terms of equipment and therefore not economic. Moreover, with the first process there is the disadvantage that about 50 percent of the bromine used is lost, so that the costs are still further increased.

The object of the present invention was to find an economic and technically simple process for the production of 1-amino-4-hydroxyanthraquinones which can be substituted in the 2- and 3-positions.

It has surprisingly been found that 1-amino-4-hydroxyanthraquinones of formula I

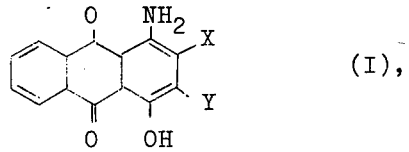

in which
a. X and Y each is hydrogen, carboxy or alkoxycarbonyl with a total of 2 to 7 carbon atoms, or
b. X is chlorine, bromine or hydroxy and Y is hydrogen, chlorine or bromine, or
c. X is alkyl of 1 to 6 carbon atoms and Y is hydrogen, chlorine, bromine, alkyl of 1 to 6 carbon atoms, carboxy or alkoxycarbonyl of 2 to 7 carbon atoms, are obtained in an economic manner and in good yields when 3'-nitrobenzoyl-benzoic acids of formula II

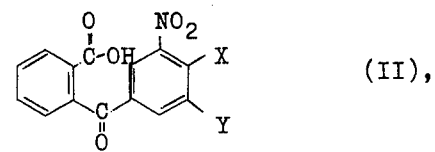

in which X and Y have the above meanings, are heated in 90 to 100 weight percent sulfuric acid or in oleum containing up to 15 weight percent of free sulfur trioxide in the presence of boric acid, boric esters, boron trihalides or their complexes to about 120° to 200°C. The reaction mixture obtained is then worked up in known manner.

The result of the process of the invention is surprising because it is known that 3'-nitro-4'-chlorobenzoyl-benzoic acid cannot be converted into the corresponding anthraquinone derivative by treatment with sulfuric acid or oleum. The ring closure to the anthraquinone derivative proceeds only after reduction of the 3'-nitrobenzoyl-benzoic acid to the corresponding amino compound. In this case, after the ring closure a mixture of 1-amino-2-chloro-and 2-amino-3-chloro-anthraquinone is obtained in a ratio of 30:60 weight percent:

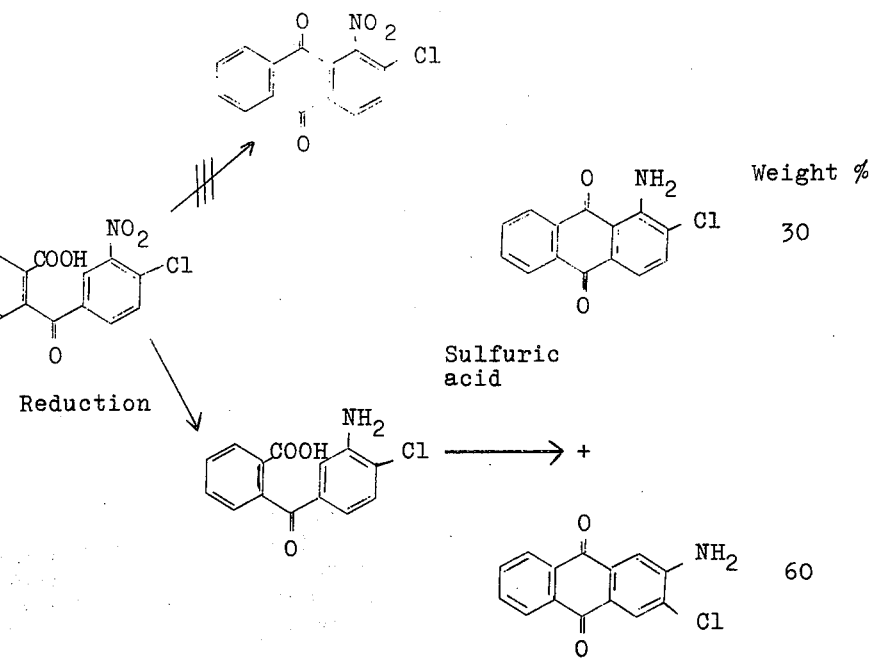

It was not to be expected that, for example, 3'-nitro-4'-chlorobenzoyl-benzoic acid would be converted into 1-amino-2-chloro-4-hydroxyanthraquinone by heating in sulfuric acid in the presence of boric acid or boron trihalides.

As alkoxycarbonyl groups for X and Y there may be mentioned, for example, methoxycarbonyl, ethoxycarbonyl, propoxycarbonyl, n-butoxycarbonyl, i-butoxycarbonyl, n-amyloxycarbonyl, i-amyloxycarbonyl, n-hexoxycarbonyl and i-hexoxycarbonyl. As alkyl groups for X and/or Y there may be mentioned methyl, ethyl, n- and i-propyl, n-butyl, i-butyl, tert.-butyl, n-amyl, i-amyl, n-hexyl and i-hexyl.

The preferred 1-amino-4-hydroxyanthraquinones of formula (I) are those in which Y is hydrogen. For use as intermediates compounds of formula (I) in which Y is hydrogen and X is chlorine, bromine or hydroxy are particularly preferred because disperse dyes with outstanding tinctorial and application properties can be produced from them.

3'-nitrobenzoyl-benzoic acids which may be used in the process of the invention include the following:

its alkali metal salts, elemental sulfur in the form of a powder, and iron in the form of a powder or turnings. An optimum yield of the reaction product is obtained when at least 4 redox equivalents of reducing agents are introduced for each nitro group. In this case conversions of up to 80 percent, based on the theoretically possible conversion, are achieved.

The amount of reducing agent depends, amongst other things, not only on the 3'-nitrobenzoyl-benzoic acid but also on the type and the condition of the reducing agent itself. In general, however, an amount of 4 to 7 redox equivalents per nitro group is sufficient. However, larger amounts of reducing agent can also be introduced without impairing the reaction.

Besides boric acid itself, salts of boric acid such as sodium borate, esters such as the trimethyl or triethyl ester, or boron trihalides such as boron trichloride, boron tribromide or boron trifluoride, or their complexes such as boron trifluoride hydrate, boron trifluoride etherate or the complexes of boron trifluoride with phosphoric acid, can be used. However, the use of boron

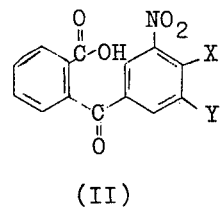

(II)

| X | Y |
|---|---|
| -Cl | -H |
| -C(CH$_3$)$_3$ | -H |
| -COOH | -H |
| -CH$\diagup$CH$_3$$\diagdown$C$_2$H$_7$ | |
| -Br | -H |
| -CH$_3$ | -Cl |
| -OH | -H |

The process of the invention is generally carried out by introducing the 3'-nitrobenzoyl-benzoic acid derivative of formula II into the mixture of boric acid and sulfuric acid or boric acid and oleum, and heating the resulting mixture to 120° to 200°C, preferably 140° to 170°C. Depending on the temperature and the nitrobenzoyl-benzoic acid introduced, the reaction is complete after 2 to 10 hours.

The reaction can also be carried out at temperatures above 200°C but products are then obtained which are not sufficiently pure for use as dyes or as intermediates for the production of dyes, and which must therefore be purified before use.

Particularly high yields of anthraquinone compounds of formula I are obtained with short reaction times when the reaction in the boric acid/sulfuric acid or boric acid/oleum mixture is carried out in the presence of reducing agents. Suitable reducing agents are, for example, sodium sulfite, potassium sulfite, sodium hydrogen sulfite, hydroxymethanesulfinic acid, the alkali metal salts of thiosulfuric acid, sodium dithionite, the salts of oxalic acid, the salts of formic acid, glucose, paraformaldehyde, iron(II) sulfate, sulfur or metals such as zinc, iron, aluminum, magnesium, nickel or copper, or even catalytically active hydrogen. When carrying out the process on a commercial scale the reducing agents that are preferred above all are paraformaldehyde, hydroxymethanesulfinic acid in the form of trihalides confers no advantage over the use of boric acid.

The reaction of the 3'-nitrobenzoyl-benzoic acid of the formula II is therefore preferably carried out in the presence of at least 4 redox equivalents of a reducing agent at temperatures between about 140° and 170°C. Under these conditions an optimum yield of the reduction product is obtained in a short time with a content of 70 to 80 weight percent or more of the desired anthraquinone derivative of formula I. The products obtained in this way are in most cases sufficiently pure for processing into dyes or other intermediates so that they can be used without purification. If for any reason a purer product is required the content of anthraquinone derivative (I) can be easily increased to 90 to 96 weight percent by suitable purification treatments such as sublimation or recrystallization or by redissolving in sulfuric acid and allowing crystallization to occur. These purified products satisfy practically all requirements to be met by starting materials for the synthesis of dyes or dye intermediates.

Because 3'-nitrobenzoyl-benzoic acids of formula II are, as a rule, produced by nitration of the corresponding benzoyl-benzoic acids in sulfuric acid, a particularly advantageous and therefore preferred variant of the process of the invention consists in producing the 3'-nitrobenzoyl-benzoic acid by nitration in sulfuric acid and introducing the nitration mixture containing the 3'-nitrobenzoyl-benzoic acid into the reaction. In this case the procedure involves first of all the nitration of the benzoyl-benzoic acid in 96 weight percent sulfuric acid by addition of nitrating acid, i.e. a mixture of nitric acid and sulfuric acid. Boric acid or one of the other boron compounds mentioned is added to the nitration mixture obtained, and the water contained in the nitration mixture is converted into sulfuric acid by the addition of oleum. After the addition of the reducing agent the mixture is heated to 120° to 200°C and, after the reaction has ended, is worked up in the usual manner.

This advantageous variant is particularly preferred for the production of 1-amino-4-hydroxyanthraquinone derivatives of formula Ib:

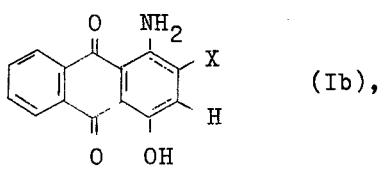

in which X is chlorine, bromine, methyl, tert.-butyl or sec.-amyl. Benzoyl-benzoic acids of formula II in which Y is hydrogen are preferred in this case.

The reaction mixture obtained upon completion of the reaction is worked up in conventional manner, for example the reaction mixture cooled to 50° to 100°C is introduced into water or ice/water and the precipitated reaction product is separated. This separation can be achieved by filtration in a suction filter, by compression in a filter press, by centrifugation or by decantation, for example in a decanter. The filter residue is then washed until neutral, suitably with warm water, and if desired dried.

The products of the process are in some cases dyes which dye synthetic fibers, for example fibers of linear polyesters, of polyamides or of cellulose acetate, brilliant red shades. Above all, however, the products serve as intermediates for the production of valuable disperse dyes.

The following Examples will further illustrate the invention. The parts and percentages mentioned are by weight.

EXAMPLE 1

1-amino-2-chloro-4-hydroxyanthraquinone 15 parts of boric acid and 31 parts of 3'-nitro-4'-chlorobenzoyl-benzoic acid are added to 300 parts of 5 percent oleum. The mixture is heated in 1 hour to 170°C and held at this temperature for 2 hours. Thereafter it is allowed to cool to about 100°C and poured into 1200 parts of water, and the precipitated product is boiled for a short time. After filtration, washing until neutral and drying, 25 parts of a red powder with a purity of 45 percent, i.e., a yield of 40 percent of the calculated yield, is obtained.

EXAMPLE 2

153 parts of 3'-nitro-4'-chlorobenzoyl-benzoic acid, 90 parts of boric acid and 20 parts of paraformaldehyde are added successively to 1800 parts of 5 percent oleum. The mixture is heated in 1 hour to 160°C and held at this temperature for 3 hours. It is allowed to cool to 100°C and poured into 6000 parts of water, and the precipitated product is boiled for a short time. After filtration, washing and drying, 120 parts of a crude product with a purity of 55 percent, i.e., a yield of 48 percent of the calculated yield, is obtained.

EXAMPLE 3

310 parts of 3'-nitro-4'-chlorobenzoyl-benzoic acid is dissolved in 4000 parts of 4 percent oleum and 35 parts of powdered sulfur is added. After stirring for 1 hour 160 parts of boric acid is added and the mixture is heated to 150°C. This temperature is maintained for 5 hours. After cooling to 100°C the product is precipitated by pouring into 16000 parts of water, stirred for 1 hour at 90°C and filtered off whilst hot. After washing until neutral and drying, 240 parts of 1-amino-4-hydroxy-2-chloroanthraquinone with a purity of 78 percent is obtained.

EXAMPLE 4

310 parts of 3'-nitro-4'-chlorobenzoyl-benzoic acid is dissolved in 4000 parts of 4 percent oleum. After the addition of 160 parts of boric acid and 150 parts of iron powder the mixture is heated within 2 hours to 160°C and held at this temperature for a further 3 hours with vigorous stirring. After working up as described in Example 3 165 parts of 1-amino-4-hydroxy-2-chloroanthraquinone with a purity of 80 percent is obtained.

EXAMPLE 5

260 parts of 4-chlorobenzoyl-benzoic acid is dissolved in 1600 parts of 96 percent sulfuric acid and nitrated at a temperature of about 35° by dripping in 122 parts of a nitrating acid consisting of 52 percent nitric acid (100 percent) and 48 percent sulfuric acid (100 percent).

Thereafter 160 parts of boric acid, 2400 parts of 24 percent oleum and 150 parts of iron powder are added and the mixture is heated in 2 hours to 160°C. The mixture is held at this temperature for a further 3 hours with vigorous stirring and thereafter worked up as described in Example 3. 260 parts of 1-amino-4-hydroxy-2-chloroanthraquinone with a purity of 80 percent is obtained, i.e., a yield of 73.5 percent of the theory, calculated on the chlorobenzoyl-benzoic acid charged.

EXAMPLE 6

70 parts of 4'-tert.-butylbenzoyl-benzoic acid are dissolved in 300 parts of 96 percent sulfuric acid and nitrated with 31 parts of the nitrating acid described in Example 5 at 35°C. After the addition of 40 parts of boric acid, 700 parts of 24 percent oleum and 35 parts of iron powder the mixture is heated in 2 hours to 155°C and afterward stirred for a further 3 hours at this temperature. After cooling to 120°C the reaction mixture is poured into 4000 parts of water. The mixture is then worked up as described in Example 3. 58 parts of crude 1-amino-4-hydroxy-2-tert.-butylanthraquinone, which dyes polyester fibers in red shades, is obtained.

EXAMPLE 7

The procedure described in Example 6 is repeated except that in place of 4'-tert.-butylbenzoyl-benzoic acid 73 parts of 4'-sec.-amylbenzoyl-benzoic acid is used. 60 parts of crude 1-amino-4-hydroxy-2-sec.-amylanthraquinone, which dyes polyester fabrics in red shades, is obtained.

EXAMPLE 8

31.5 parts of 3'-nitro-4'-carboxybenzoyl-benzoic acid, 15 parts of boric acid and 15 parts of iron powder are heated in 300 parts of 5 percent oleum to 160°C in 1 hour. The mixture is afterward stirred for 2 hours at this temperature, then allowed to cool to 100°C and poured into 1200 parts of water. After filtration, washing until neutral and drying, 26 parts of crude 1-amino-4-hydroxyanthraquinone 2-carboxylic acid is obtained and can be used without further purification to dye acetate rayon brilliant red violet and nylon 6 blue-violet.

EXAMPLE 9

35 parts of 3'-nitro-4'-bromobenzoyl-benzoic acid, 15 parts of boric acid and 4 parts of powdered sulfur are heated in 300 parts of 5 percent oleum to 150°C for 5 hours. Thereafter the reaction mixture is allowed to cool and poured into 1200 parts of water. After stirring for a short time it is filtered, washed until neutral and dried. 28 parts of 1-amino-4-hydroxy-2-bromoanthraquinone with a purity of 80 percent is obtained.

EXAMPLE 10

28.7 parts of 3'-nitro-4'-hydroxybenzoyl-benzoic acid, 15 parts of boric acid and 4 parts of powdered sulfur are heated in 300 parts of 5 percent oleum to 150°C for 6 hours. The product is worked up according to Example 9. 24 parts of 1-amino-2,4-dihydroxyanthraquinone with a purity of 85 percent is obtained.

EXAMPLES 11–18

153 parts of 3'-nitro-4'-chlorobenzoyl-benzoic acid, 90 parts of boric acid and 20 parts of sulfur are successively added to 1800 parts of 5 percent oleum. The mixture is reacted under the conditions given in the following Table. The reaction mixture is worked up as described in Example 2:

| EXAMPLE | 11 | 12 | 13 | 14 | 15 | 16 | 17 | 18 |
|---|---|---|---|---|---|---|---|---|
| Temperature (°C) | 120 | 130 | 140 | 160 | 170 | 180 | 190 | 200 |
| Reaction time (hours) | 20 | 20 | 10 | 4 | 3 | 2 | 2 | 2 |
| Yield (parts) | 100 | 110 | 120 | 125 | 120 | 110 | 110 | 110 |
| Purity of 1-amino-2-chloro-4-hydroxy-anthraquinone (%) | 30 | 63 | 70 | 68 | 65 | 60 | 55 | 50 |

EXAMPLE 19

153 parts of 3'-nitro-4'-chlorobenzoyl-benzoic acid, 90 parts of boron trifluoride-phosphoric acid and 20 parts of sulfur are successively added to 1800 parts of 5 percent oleum. The mixture is heated to 160°C and held at this temperature for 4 hours. It is allowed to cool to 100°C and pured into 6000 parts of water, and the precipitated product is boiled for a short time. After filtration, washing and drying, 125 parts of a crude product with a purity of 48 percent of 1-amino-2-chloro-4-hydroxyanthraquinone is obtained.

EXAMPLE 20

153 parts of 3'-nitro-4'-chlorobenzoyl-benzoic acid and 150 parts of trimethyl borate are added to 1500 parts of 5 percent oleum. The mixture is slowly heated to 155° to 160°C and stirred at this temperature for 7 hours. After working up as described in Example 19, 90 parts of a crude product with a purity of 45 percent of 1-amino-2-chloro-4-hydroxyanthraquinone is obtained.

EXAMPLE 21

153 parts of 3'-nitro-4'-chlorobenzoyl-benzoic acid, 90 parts of boric acid and 70 parts of the sodium salt of hydroxymethanesulfinic acid are stirred into 2000 parts of 5 percent oleum and the mixture is heated to 150° to 155°C for 5 hours. After working up as described in Example 19, 135 parts of product with a purity of 78 percent of 1-amino-2-chloro-4-hydroxyanthraquinone is obtained.

We claim:

1. A process for the production of a 1-amino-4-hydroxyanthraquinone of the formula

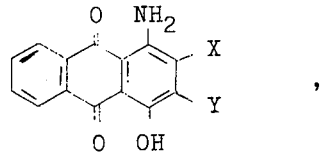

in which

X is chlorine, bromine or hydroxy and Y is hydrogen, chlorine or bromine, wherein a 3'-nitrobenzoyl-benzoic acid of the formula

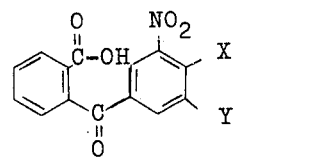

in which X and Y having the meanings defined above, is heated in 90 to 100 weight percent sulfuric acid or in oleum with up to 15 weight percent of free sulfur trioxide in the presence of boric acid, a boric ester, a boron trihalide or a boron trihalide complex to 120° to 200°C.

2. A process according to claim 1 wherein a 3'-nitrobenzoylbenzoic acid in which Y is hydrogen is used.

3. A process according to claim 1 wherein the reaction is carried out in the presence of a reducing agent.

4. A process according to claim 3 wherein iron, sulfur, parformaldehyde or an alkali metal salt of hydroxymethanesulfinic acid is used as reducing agent.

5. A process according to claim 3 wherein at least 4 redox equivalents of reducing agent are used for each nitro group.

6. A process according to claim 5 wherein 4 to 7 redox equivalents of reducing agent are used for each nitro group.

7. A process according to claim 1 wherein the reaction is carried out at 140° to 170°C.

8. A process according to claim 1 wherein the 3'-nitrobenzoylbenzoic acid is produced by nitration in sulfuric acid and is introduced into the reaction in the form of the nitration mixture.

* * * * *

UNITED STATES PATENT AND TRADEMARK OFFICE
CERTIFICATE OF CORRECTION

PATENT NO. : 3,880,892
DATED : April 29, 1975
INVENTOR(S) : HILLER et al

It is certified that error appears in the above-identified patent and that said Letters Patent are hereby corrected as shown below:

In the Heading, delete "[22] Filed: December 15, 1974"

and insert--[22] Filed: December 15, 1972--

In the Heading, insert--[30] Foreign Application Priority Data

December 18, 1971    Germany    P 21 63 059.1--

In Column 6, Line 26, Delete "165" and insert--265--

Signed and Sealed this eleventh Day of May 1976

[SEAL]

Attest:

RUTH C. MASON
*Attesting Officer*

C. MARSHALL DANN
*Commissioner of Patents and Trademarks*